Patented July 10, 1945

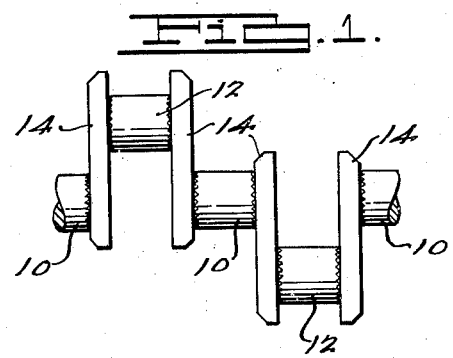
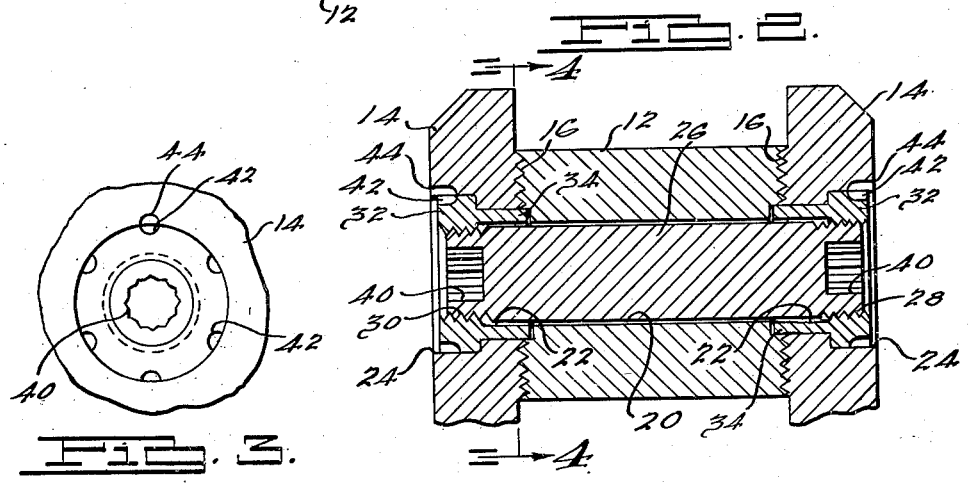
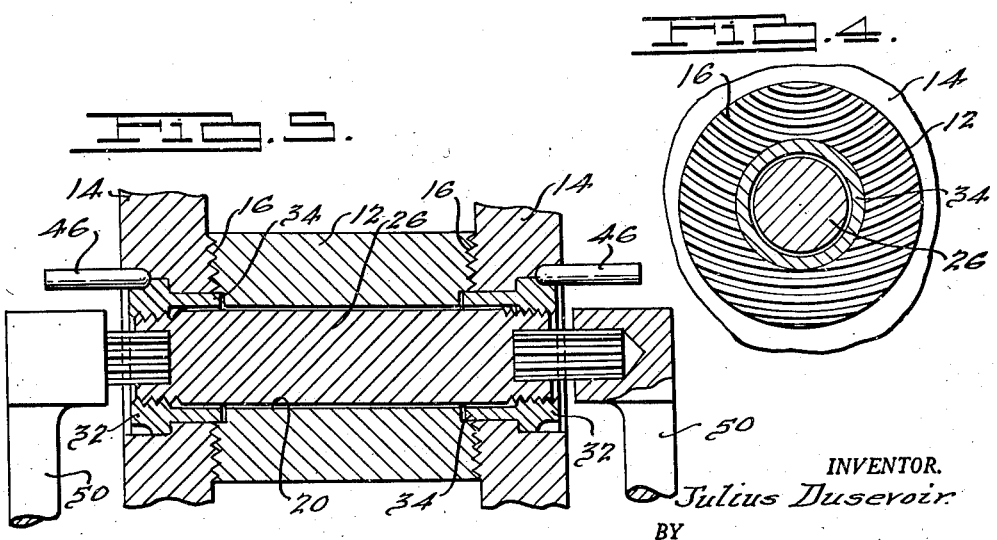
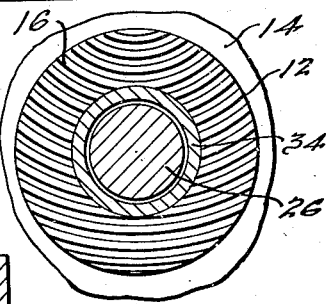

2,380,099

UNITED STATES PATENT OFFICE 2,380,099

CRANKSHAFT

Julius Dusevoir, Dearborn, Mich., assignor to Century Motors Corporation, Dearborn, Mich., a corporation of Michigan Application March 16, 1944, Serial No. 526,669

6 Claims. (Cl. 74—598)

This invention relates to crankshafts of the type employed in internal combustion engines and particularly to the so-called built-up type thereof in which a plurality of separately formed parts are releasably secured together, the principal object being the provision of a novel form of construction for securing the separable parts of such crankshaft together in a simple, efficient and economical manner.

Objects of the invention include, in combination with an engine crankshaft comprising a plurality of separately formed parts, means for releasably securing three of such parts in assembled relationship comprising a differential screw projecting through said parts and provided with cooperating separately formed nut parts; the provision of a construction as above described in which the plurality of parts comprise a pair of crank throws and an intervening journal member, the differential screw being received in aligned openings in all of these parts and having separately formed nuts received on its opposite end portions and received in pockets formed in the throws; the provision of a construction as last described in which the cooperating faces of the journal member and the throws are provided with interlocking serrations or the equivalent maintaining the crankshaft throws against relative rotation with respect to the journal member when in operative relation with respect thereto; the provision of a construction as above described in which the throws are provided in their outer faces with cylindrical openings therein concentric with the differential screw and the nuts are cylindrical and are relatively closely received in such openings; and the provision of a construction as last described in which the differential screw is provided with wrench receiving openings in both ends thereof and the nuts and their cooperating recesses are formed to permit the nuts to be temporarily locked against rotation in their corresponding recesses while the differential screw is being drawn up.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary, side elevational view of a crankshaft for a multi-cylinder internal combustion engine;

Fig. 2 is an enlarged fragmentary, sectional view taken in the plane of the sheet and axially through the left-hand crank pin of the construction shown in Fig. 1;

Fig. 3 is a fragmentary end view of the construction shown in Fig. 2;

Fig. 4 is a fragmentary transverse sectional view taken on the line 4—4 of Fig. 2 showing the serrated end of the crank pin; and, Fig. 5 is a view similar to Fig. 4 but illustrating the means employed in conjunction therewith for tightening up or loosening the differential screw.

In my United States Letters Patent No. 2,340,458 issued February 1, 1944, on Engine crankshaft, a crankshaft is shown in which the crank pins are formed separately from the throws and are releasably secured therebetween by means of a differential screw which projects through the crank pin and and the cooperating throws and is threaded at its opposite ends directly into the latter. It has been demonstrated that this is a very desirable type of construction and it is particularly desirable to employ such differential screw inasmuch as by its use a crank pin or a main journal may be clamped between a pair of throws with an unusually great amount of force and which force sets up such a great amount of friction between the differential screw and the throws that there is no necessity for using any additional locking means for guarding against the possible loosening up of the screw in service.

There has, however, been one drawback to my prior construction above referred to in that the differential screw being directly threaded into the throws, it requires in assembly that the differential screw be threaded a predetermined number of turns into one of the throws before it starts threading into the other throw, and the parts must be held together approximately in this latter assembled position at the time the differential screw begins to thread into the remaining throw. Furthermore, if a thread in one of the throws is not accurately formed to size, or is damaged, it is necessary to scrap the entire throw. It is the principal object of the present invention to eliminate these disadvantages of my prior construction and to provide such construction in which the differential screw may be threaded into place in a quick and easy manner and without the careful relation of the parts during its application thereto that is required in my prior construction. This is accomplished in accordance with the present invention by providing nuts for the opposite ends of the differential screw and eliminating direct threaded reception of the screw with the throws, the nuts being received in pockets provided therefor in the outer faces of the throws. By this means one of the nuts may be threaded onto the screw before the screw is inserted in position, the screw and the nut assembled thereto is then inserted into position, the remaining nut threaded onto the remaining end of the screw, and the screw then tightened up, the resulting friction exerted between the screw and its nut and between the nuts and the crankshaft throws being sufficient to positively lock all of these parts together without the need of any additional locking means to prevent possible inadvertent loosening up of the nuts on the screw in service. Furthermore, error in forming the threads in a nut, or damage thereto after forming, requires only the scrapping of such nut and not the throw itself.

Referring now to Fig. 1 an engine crankshaft is shown as comprising main journals 10, crank journals or pins 12, and intervening throws 14, all of these parts being formed separately from one another and thereafter secured together in accordance with the present invention.

The contacting faces of the journals 10 and 12 and the throws 14 are preferably formed for interlocking relationship with respect to each other when in assembled relation so as to prevent relative rotation of the throws 14 about the axis of either the main journals 10 or crank journals 12. On the other hand it will be appreciated that in the broader aspects of the invention it is not necessary that both the main journals 10 and crank journals 12 are formed separately from the throws 14 as one or the other may be formed integrally therewith as, for instance, in the case of my United States Patent No. 2,340,458 above referred to in which the crank journals 12 only are formed separately from the throws.

The particular form of means employed for providing an interlocking relationship between a pair of throws and an intervening journal is more or less unimportant as far as the present invention is concerned. In other words, it may be of the type shown in my United States Letters Patent No. 2,331,541, issued October 12, 1943, on Engine crankshaft, the type illustrated in my United States Letters Patent No. 2,324,373, issued July 13, 1943, on Crankshaft, or any similar or equivalent type. However, for the purpose of illustration in the particular crankshaft shown the cooperating faces of the crank pin or journal 12, which is shown in Figs. 2 to 5, inclusive, for the purpose of illustrating the application of the invention to either a main or crank journal, and the cooperating throws 14 are formed with complementary curved serrations 16 struck from a common center outside the surface of the crank pin or journal 12, thus being of the same character as shown in my United States Patent Nos. 2,324,373 and 2,340,458 above referred to.

The crank pin or journal 12 is provided with a cylindrical axially concentric opening 20 therein and the throws 14 are each provided with a larger concentric opening 22 therein, the outer ends of the opening 20 being concentrically enlarged to the same diameter as the openings 22 above described. At its axially outer end each of the openings 22 is enlarged in diameter as at 24 and in concentric relation with respect thereto to form pockets opening onto the outer face of the throws 14. A differential screw 26 is projected relatively loosely through the openings 20 and 22 and its threaded end portions lie within the pockets 24. The threads at one end of the screw 26 are of finer pitch than those at the opposite end, and as a matter of illustration it may be assumed that the threads 28 at the righthand end of the screw 26 as viewed in Figs. 2 and 5 are eighteen to the inch and the threads 30 at the opposite end of the screw 26 are sixteen to the inch. Relatively closely but rotatably received in each of the pockets 24 is a nut 32 threaded upon the corresponding end of the screw 26 and each seating against the bottom of the corresponding pocket.

Each nut 32 is provided with a concentric integral sleeve-like cylindrical projection 34 of an external diameter to be closely but rotatably and slidably received in the corresponding opening 22 in the corresponding throw 14 and at least partially within the enlarged end portion of the opening 20 at the corresponding end of the journal 12 when the nut is threaded fully home. The bore of each projection 34 is such as to preferably relatively loosely receive the corresponding end of the screw 26 therein. The sleeves 34 in closely fitting the openings 22 and the corresponding enlarged end portions of the hole 20, and extending in bridging relation to the joint between the throws 14 and journal 12, serve to lock the journal 12 against displacement with respect to the throws 14 laterally of the journal. The sleeves 34 being fixed to the nuts 32 are removable therewith, permitting the journal 12 to be removed from between the throws 14 upon removal of the nuts 32 and screw 26 without necessitating substantial separation of the throws 14 axially of the journal 12.

It will be appreciated that because of the differential threads on the screw 26 the screw may be tightened up in the nuts 32, or the nuts 32 on the screw 26, with an extremely great force. This force is, in fact, so great when these parts are properly tightened that not only does it effectively hold the serrated abutting faces of the crank journal 12 and throws 14 firmly together against separation but the friction set up between the threaded ends of the screw 26 and the nuts 32, and between the nuts 32 and the bottoms of the pockets 24, is so great that there is no danger of these parts becoming loose in service and for this reason it is not necessary to employ locking wires or equivalent additional locking means to prevent possible loosening up of the nuts 32 on the screw 26.

It has been found that in tightening up the above structure this may be more easily and effectively done by rotating the screw 26 in the nuts 32 rather than attempting to turn the nuts 32 on the screw 26. In order to enable this to be readily accomplished the screw 26 is provided in its opposite ends with wrench receiving sockets 40, preferably but not necessarily of the double or staggered hexagonal type shown, and particularly where the fit between the screw 26 and the nut 32 is a relatively close or tight fit, then it is necessary to provide some means for holding the nuts 32 against rotation until the screw 26 has been tightened up in them sufficiently to build up enough friction between each nut and the bottom of its corresponding pocket 24 to hold it against rotation. In the present case this is accomplished by providing each nut with a plurality of preferably equally angularly spaced semi-cylindrical and axially parallel grooves 42 in its peripheral surface and opening onto the outer end face of the nut 32. Then at one point in the circumference of each pocket 24 a semi-cylindrical groove 44 is formed in the peripheral wall of such pocket and of such size that when a groove 42 is aligned with it they cooperate to form a cylindrical opening. In such position of alignment a pin such as 46, illustrated in Fig. 5, may be projected into the opening formed by the aligned grooves 42 and 44 thereby locking the cooperating nut 32 against rotation with respect to the corresponding throw 14.

In practice in assembling a crankshaft with the construction thus described a journal member 10 or 12 is positioned between a pair of throws 14 and these are aligned with each other and the interengaging serrations 16 are arranged in interfitting relation with respect to each other thereby to maintain the throws in proper angular relation with respect to each other about the axis of the cooperating journals 10 or 12. The screw 26 which is to be employed and to which one of the nuts 32 may have already been applied to approximately the relative position desired therefor on the screw 26 in the final assembly, is projected into the position which it assumes in the final assembly and the remaining nut 32 may be threaded into position thereon until it contacts the bottom of its corresponding pocket 24. Otherwise the nut for the finer threaded end 28 of the screw 26 may be threaded on the screw a predetermined number of turns, the screw projected into place, and the remaining nut started on its corresponding end of the screw. In either case the pins 46 are then inserted to lock the nuts against rotation with respect to the throws and a wrench such as indicated at 50 in Fig. 5 is applied to the sockets 40 at each end of the screw 26 and the screw is then rotated to tighten up the nuts 32 on the screw.

Preferably two wrenches are employed as described particularly after the nuts 32 have bottomed in their corresponding recesses 24 and particularly to pull the screw 26 up to its final clamping position. It has been found that two such wrenches are necessary to apply a substantially equal pull on both ends of the screw 26 if the screw is to be tightened up to the maximum extent. It has been found that if one wrench only is employed then there is a sufficient twist or torsional yielding in the screw 26 in the final tightening up operation to prevent the same complete tightening effect that can be obtained by the use of two such wrenches as described. Furthermore, when the screw is tightened up by two wrenches as described it is impossible to loosen the screw 26 by the application of one wrench only thereto as in such case a slight rotational movement imparted to one end of the screw in twisting the screw will cause the screw to shorten up and cause the nuts 32 to bind even tighter in their recesses 24 than otherwise. It is particularly for this reason that it is not necessary to employ any separate locking means between the nuts and the screw to prevent them from inadvertently loosening up in service.

It will be appreciated from the foregoing that by employing the nuts as described the differential screw may be assembled in position in a quicker and easier manner than when the screw is threaded directly to the throws as in my prior Patent No. 2,340,458 above referred to. The nuts 32 being fully received in pockets in the throws, they offer no external projections thereon and do not require any stronger, heavier throws than in my previous construction. Furthermore, threads may be formed in the nuts 32 more quickly and more economically than in the throws themselves and where such a thread is spoiled it does not involve the same monetary loss as would be the case if the threads were formed in the throw directly.

Having thus described my invention, what I claim by Letters Patent is:

1. In an engine crankshaft of the class wherein there is a pair of throws spaced from one another longitudinally of the axis of said crankshaft, and a separately formed journal member is interposed between said throws, the combination with said throws and said journal member of a screw member having threads of different pitch at opposite ends thereof projected through said throw members and said journal member, the outer faces of said throws being recessed, and nuts seated in said recesses threadably engaging the corresponding ends of said screw member.

2. In a crankshaft of the class wherein there is a pair of throws, a separately formed journal member is interposed between said throws, said journal member and said throws have aligned openings therein, and the outer ends of said openings in said throws are enlarged to form pockets concentric therewith, the combination with said throws and said journal member of a screw element projected through said aligned openings and having screw threaded end portions of different pitch projecting into said pockets, and a nut threadably received on each end of said screw element and completely received within the corresponding of said pockets.

3. In an engine crankshaft of the class wherein there is a pair of throws, a separately formed journal member is received between said throws, said throws and journal member have aligned openings therein and said openings in said throws are enlarged at their outer ends to form pockets opening onto the outer faces of said throws, the combination with said throws and said journal member of a screw element received in said openings and having opposite end portions thereof provided with threads, the threads at one end of the screw element being of a different pitch than the threads at the opposite end thereof and said threaded ends projecting into said pockets, a nut received in each of said pockets and threadably engaging the corresponding ends of said screw elements, said screw element having wrench receiving means at opposite ends thereof, and means for releasably locking said nuts against rotation in said pockets.

4. In an engine crankshaft of the class wherein there is a pair of throws, a separately formed journal member is received between said throws, said throws and journal member have aligned openings therein and said openings in said throws are enlarged at their outer ends to form pockets opening onto the outer faces of said throws, the combination with said throws and said journal member of a screw element received in said openings and having opposite end portions thereof provided with threads, the threads at one end of the screw element being of a different pitch than the threads at the opposite end thereof and said threaded ends projecting into said pockets, a nut received in each of said pockets and threadably engaging the corresponding ends of said screw elements, said nuts having a plurality of angularly spaced grooves in the peripheral faces thereof, and the peripheral walls of said pockets each having a groove therein adapted to be aligned with one of said grooves in the corresponding of said nuts.

5. In an engine crankshaft of the class wherein there is a pair of throws, a separately formed journal member is interposed between said throws, the abutting faces of said journal member and said throws have complementary and interfitting serrations formed thereon, said journal member and said throws have aligned openings therein in axially parallel relation with respect to the axis of said journal, and the outer ends of said openings in said throws are concentrically enlarged to form pockets, the combination with said throws and said journal member of a screw element received in said openings, the opposite ends of said screw element being located in said pockets and being threaded, the threads at one end of said screw element being of a different pitch than those at the opposite end thereof, a nut received in each of said pockets in relatively close but rotatable relation therein, the opposite ends of said screw element having wrench receiving sockets therein, the periphery of said nuts being provided with a plurality of angularly spaced grooves therein, and each of said pockets being provided with a groove in the peripheral wall thereof adapted to be aligned with one of said grooves in the corresponding of said nuts.

6. In a crankshaft of the class wherein there is a pair of throws, a separately formed journal member is interposed between said throws, said journal member and said throws have aligned openings therein, and the outer ends of said openings in said throws are enlarged to form pockets concentric therewith, the combination with said throws and journal member of a screw element projected through said aligned openings and having screw threaded end portions of different pitch projecting into said pockets, a nut threadably received on each end of said screw element and completely received within the corresponding of said pockets, and a cylindrical sleeve formed integrally with each of said nuts extending into bridging relation with respect to the joint between the corresponding of said throws and said journal member and closely received by both said throw and journal member.

JULIUS DUSEVOIR.